Hertle & Thompson.
Heddle Mach.
No. 3,724. Reissued Nov. 9, 1869.
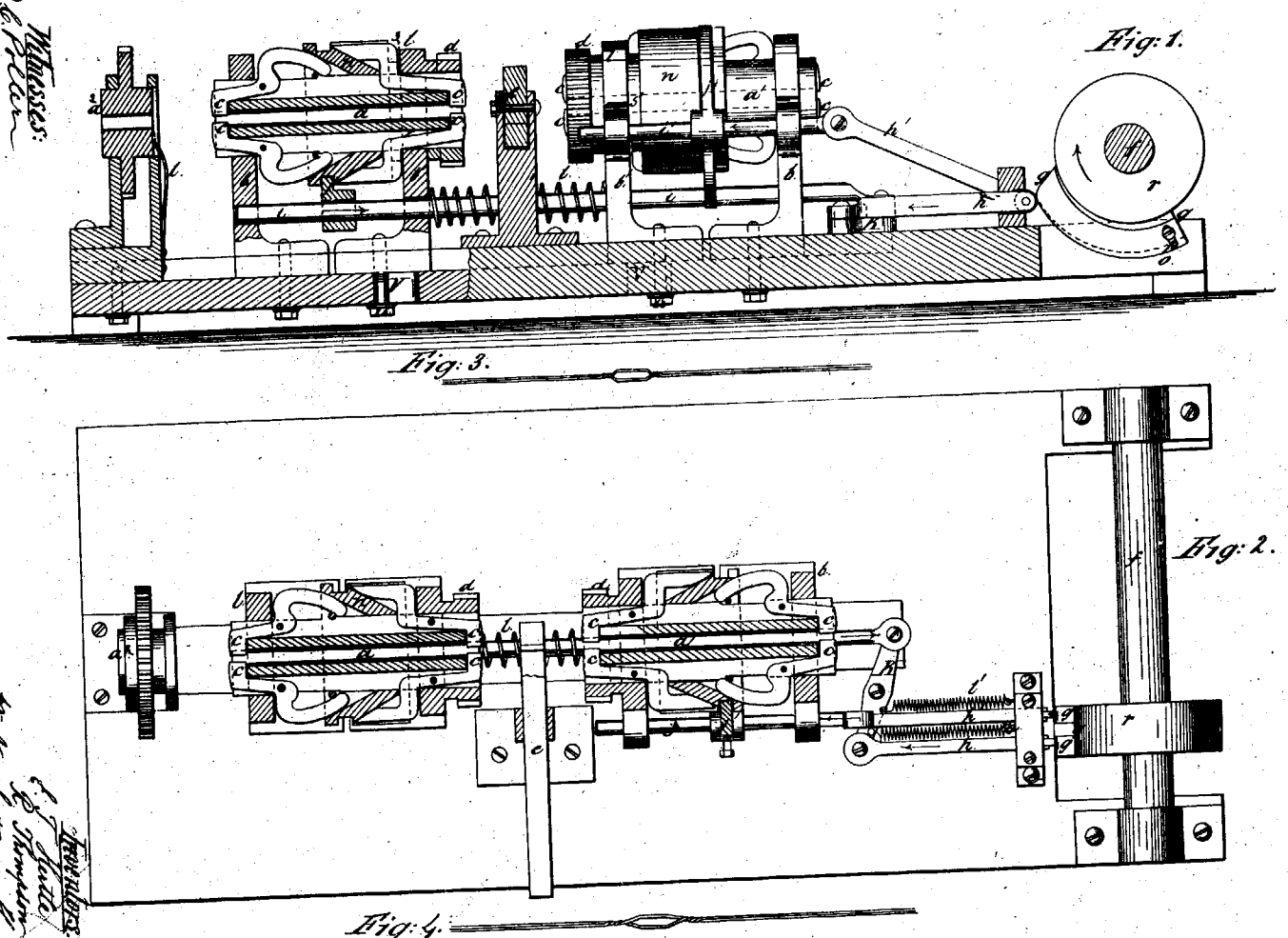
Witnesses:
J. E. Poller
E. F. Kastenhuber.
Inventors:
E. T. Hertle
R. Thompson
by Van Santvoord & Hauff
Attys

United States Patent Office.

EMIL T. HERTLE AND RICHARD THOMPSON, OF NEW YORK, N. Y.

*Letters Patent No.* 79,905, *dated July* 14, 1868; *reissue No.* 3,724, *dated November* 9, 1869.

IMPROVEMENT IN MACHINERY FOR MAKING WIRE HEDDLES.

The Schedule referred to in these Letters Patent and making part of the same.

*To all whom it may concern:*

Be it known that we, EMIL T. HERTLE and RICHARD THOMPSON, of the city, county, and State of New York, have invented a new and useful Improvement in Machinery for Making Wire Heddles; and we do hereby declare the following to be a full, clear, and exact description thereof, which will enable those skilled in the art to make and use the same, reference being had to the accompanying drawing, forming part of this specification, in which drawing—

Figure 1 is an elevation, partly in section, of a portion of a machine to which our improvement is applied.

Figure 2 is a plan view, the cylinder being shown in horizontal section.

Figure 3 represents an improved heddle, made with the aid of our invention.

Figure 4 represents a heddle made on a machine to which our invention has not been applied.

Similar letters indicate corresponding parts.

This invention relates to an improvement of machinery for making wire heddles, and consists, in general terms, in shortening the distance between the cylinders and jaws, which grasp the heddle on each side of the pincers that forms the eye, and between said pincers, while the operation of twisting the wires and forming the eye is going on, so as to relieve the wires of undue strain, and make more perfect twists in the heddle, and a more perfect eye, and also to make the ends of the eye close and blunt, so that the warp thread will not be liable to catch between the wires.

Our invention can be modified, by making only one of the hollow cylinders or spindles movable, but more perfect work can be done by making both of them movable. Our invention, however, embraces both plans.

We have, in this example, shown our invention applied to an ordinary wire-heddle machine, of the kind known as the Finkle machine, but we have shown only such parts of such machine as we have thought necessary to be represented in order to fully explain our invention.

The letters *a a*[1] designate the usual revolving hollow cylinders, which are placed on either side of the pincers *e*, between whose jaws the central or warp-eye of the wire heddle is formed.

These cylinders *a a*[1] are supported in head-stocks, *b b'*, in which they are free to turn their revolutions, at the times required, being accomplished by means of geared wheels, *d d*, on their inner ends, which are put in rotation by means of intermediate gear-wheels and shaft, not shown, that receive motion from the driving-shaft *f*.

Each cylinder has, as usual, two pairs of jaws, *c c*, one pair at each end, for the purpose of seizing and holding the wires that form the heddle during the operation of twisting the strands to form the eye, the wire being grasped for this purpose by the eye-forming pincers *e*.

Said jaws are arranged to work in slots made in the cylinders lengthwise thereof, in which slots they are pivoted, as is shown in the drawing.

The jaws are opened and closed automatically by the movements, on the cylinders, of the sliding collars *n n*, said collars being made with inclination and pins, which operate upon the tail-ends of the jaws, as is clearly represented in the drawing.

We do not claim the sliding collars *n*, nor their jaws *c*, nor their inclinations for operating the jaws, as these devices are in common use in wire-heddle machines; but our invention consists, among other things, in shortening the distance between the cylinders *a a*[1], or their jaws, and the pincers, while the twist is being given and the warp-eye formed.

The sliding collars *n n* are moved to and fro by a cam, *g g*, formed on a portion of the periphery of the disk placed on the driving-shaft *f*, which cam is so formed as to move the collars the required distance on the cylinders, and hold them stationary while the twist is being given to the heddle, the said cam being so timed as to release them and open the jaws as soon as the twist is completed.

The forward end of cam *g g* imparts motion to the collars *n n* by means of sliding-bars *h h'*, and sliding rods *i i'*, said rods *i i'* being provided with forks *j j'*, which enter grooves, made around the collars, and impart to the latter the motion of the rods, in the ordinary manner.

Each of the bars *h h'* are provided with anti-friction rollers at the ends, which come in contact with the forward end of the cam *g g*, and they are constantly forced toward the cam by springs *l* and *m*.

Rod *i'* and bar *h'* are directly connected to each other by a hinge-joint, as shown in the drawing, and the rod *i*, which acts in conjunction with cylinder *a*, which is the most distant from cam *g*, is connected to its bar *h* by a horizontal lever *k*, of the first order.

After the jaws *c* have been closed, preparatory to the revolution of the cylinders *a a*[1], we shorten the distance between said cylinders, or their jaws and the pincers, for the more perfect twisting of the wires, and the more perfect formation of the eye than has hitherto been attained, by the following construction and operation:

The cam *g g*, which is in two parts, each independent of the other, is made by pivoting the forward ends of the arc-shaped pieces *g g* to an arc-shaped rib *q*, projecting from the periphery of the disk *r*, which rib *q* forms the foundation of the cam or cams.

The rear ends of the cams *g g* are slotted, as at *p*, fig. 1, to receive set-screws, which secure them to the foundation rib *q*, in any desired position of eccentricity to the centre of the shaft *f*.

The periphery of the arc-shaped pieces *g g* form the cams, from which the required movements of the cylinders *a* $a^1$, toward each other, or toward the pincers, are obtained. Said movements are communicated thereto, through the action of said cams *g g* against the ends of sliding arms *h h'*, after the forward end of said cams *g g* has operated to move the sliding collars *n n*, to the extent of the distance allowed to them, toward the geared ends *d d* of said cylinder, said sliding collars being then arrested by coming up against circular shoulders, *s s'*, formed on the cylinders next to the head-stocks *b' b'*.

These head-stocks *b' b'* are movable in grooved beds, being held therein by screws *u*, which go through slots, *v*, in the bottom of the bed, and they are moved toward each other by the action of the eccentric portions *o* of said cams *g g*, which give to the sliding rods *i i'* a further forward movement in the direction indicated by the arrows, thereby pushing the collars *n n* against the shoulders *s s'* of the cylinders *a* $a^1$, and causing the said cylinders, and the head-stocks *b' b'*, which support their adjacent ends, to approach the pincers *e*, in whose jaws that part of the heddle where the warp-eye is formed, is grasped.

The extent of this approach or movement of said cylinders and head-stocks toward each other, is determined by the amount of eccentricity given to the cam pieces *g g*, and the duration of the movement is determined by the length of the arc occupied by them.

When their ends *o* have passed the bars *h h'*, the springs *l' m* restore the bars to their former position, near the disk *r*, and draw the rods *i i'* back in directions respectively opposite to the directions indicated by the arrows marked on said rods, whereby the sliding collars *n n* are also drawn back to their former positions on their respective cylinders, and the jaws *c c* are opened.

At the same time the cylinders *a* $a^1$, and the movable head-stocks, are moved back to their original positions, by the operation of the spring *l*, which is arranged on rod *i*, between the movable head-stocks *b' b'*, in such a manner that it becomes compressed by their movement toward each other, and when the collars *n n* cease to press against the shoulders *s s'*, the tension of said spring *l* operates to push the said head-stocks back again to their former position, taking with them the cylinders, with whose shoulders *s s'*, the head-stocks are always in contact.

The wires that form the heddle are drawn into the machine through the spindle or cylinder $a^2$ at the receiving end of the machine, which spindle carries the tooth for forming the eye at one end of the heddle, and is so arranged in its head-stocks as to be allowed some play endwise, being restored to its original position by the force of a spring, *t*, and thereby the same object is attained in forming the eye at the end, which we have attained in forming the warp-eye by shortening the distance between the twisting-mechanism and the eye-forming die or pincers.

Our invention enables us to prevent the formation of acute angles and crevices at the ends of the warp-eye of the heddle, as is now common in wire heddles, and to form smooth and rounded outlines at the ends of said eye, so that in the operation of forming sheds, in weaving, the warp will not catch in the ends of the eye, nor be frayed and torn therein, as is now commonly the case when wire heddles, of the ordinary construction are used.

It will be observed, that by making the inner head-stocks *b' b'*, and the cylinders or spindles *a* $a^1$, capable of motion toward each other, as hereinabove set forth, they are both allowed to yield to the strain produced on them to draw them together, by reason of the shortening of the wires that compose the heddle in the process of twisting, and we use this arrangement by preference, but it will be readily understood that the object of our invention can also be attained by giving to one of the cylinders, or their jaws, and to the pincers *e*, a movement toward the other cylinder, and we do not wish to be confined to the precise mechanism which we have shown in the drawings.

What we claim as new, and desire to secure by Letters Patent, is—

1. In machines for making wire heddles, the arrangement of mechanism, substantially as described, whereby the distance between the twisting-mechanism and the eye-forming die or pincers is shortened, during the operation of twisting the wire.

2. Arranging the head-stocks *b' b'*, which support the inner or adjacent ends of the cylinders *a* $a^1$, substantially in the manner described, and for the purpose set forth.

3. The arrangement of a cam or cams, *g*, in combination with the movable cylinder or cylinders *a*, substantially as described.

4. The combination of the movable cylinders *a* $a^1$, the rods *i i'*, bars *h h'*, and cams *g g*, substantially as set forth.

5. The combination of a spring, *t*, with the sliding tooth-carrying pinion $a^2$, substantially as described.

EMIL T. HERTLE.
RICHARD THOMPSON.

Witnesses:
W. HAUFF,
C. WAHLERS.